No. 750,250. PATENTED JAN. 26, 1904.

W. S. BRYAN.
ELECTRIC BATTERY.
APPLICATION FILED SEPT. 28, 1903.

NO MODEL.

No. 750,250.

Patented January 26, 1904.

UNITED STATES PATENT OFFICE.

WINFIELD S. BRYAN, OF CINCINNATI, OHIO.

ELECTRIC BATTERY.

SPECIFICATION forming part of Letters Patent No. 750,250, dated January 26, 1904.

Application filed September 28, 1903. Serial No. 174,923. (No model.)

*To all whom it may concern:*

Be it known that I, WINFIELD S. BRYAN, a citizen of the United States, and a resident of Cincinnati, in the county of Hamilton and State of Ohio, have invented a certain new and useful Improvement in Electric Batteries, of which the following is a full, clear, and exact description, reference being had to the accompanying drawings, which form a part of my specification.

My invention relates to electric batteries, and has for its object a battery which shall be of compact arrangement, economical construction, and of the highest efficiency. It is of the general class of batteries in which the fluid remains in contact with the elements only during the period of action of the battery. Its advantages will appear more fully as I proceed with my specification.

Figure 1:
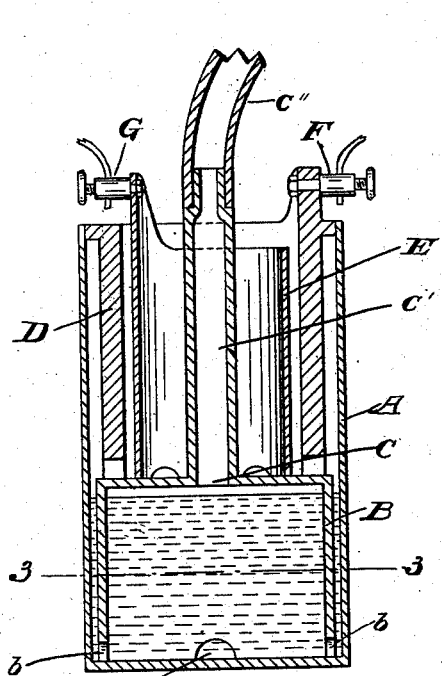
Figure 2:
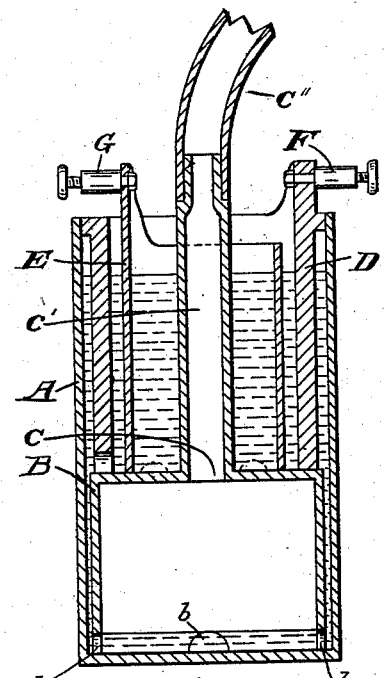
Figure 3:
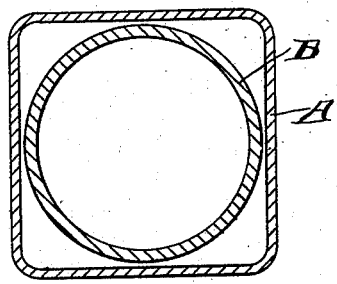

Figures 1 and 2 are vertical sections through my improved battery, the first showing the position of the liquid when not in contact with the elements and the second showing its position when in contact with the elements. Fig. 3 is a cross-section of the battery on the line 3 3 of Fig. 1.

A is the jar containing the fluid and battery elements.

B is an inverted cup of slightly smaller dimensions than the inside of the jar and is provided at its lower edges with one or more openings $b$ and also with an opening C at the top, to which is fitted a tube C'', which extends, preferably, above the top of the jar A, where it has attached to it a rubber tube C'''.

D and E are the battery elements, of the usual cylindrical form, resting upon the top of the inverted cup B. The electric connections are made at F and G in the usual manner.

The jar A is filled with the liquid up to a point slightly below the elements of the battery, and the tube C' is connected with a source of compressed-air supply which is controlled by any usual compound multiple valve by means of which compressed air may be admitted into the tube C' and when desired allowed to escape therefrom. The valve is not shown in the drawings for the reason that it forms no part of this invention.

As will be seen in Fig. 3, I have shown the jar A of substantially rectangular form and the inverted cup B of cylindrical form; but of course it will be understood that it is not essential to make these parts in this particular form, and I do not limit my invention with respect thereto.

The operation of my improved battery is as follows: Fig. 1 shows the liquid at the level at which it stands when the battery is not in use, in which case there is no pressure on the surface of the liquid beyond that of the atmosphere. When it is desired to start the battery, the valve controlling the source of compressed-air supply is opened, and compressed air passes through the tube C' and the opening C into the inverted cup B, which forces the liquid out through the openings $b$ at the bottom and up into the upper part of the cell, so as to bring it into contact with the elements, as illustrated in Fig. 2. When it is desired to stop the action of the battery, the compressed air is turned off and the air allowed to escape again through the tubes C' $c$, whereupon the liquid by the action of gravity drops back into the lower part of the cell below the elements of the battery, which of course stops the action of the battery.

Having thus described my invention, what I desire to claim as new and cover by Letters Patent is—

1. A battery-cell comprising a containing element an inverted cup resting on the bottom thereof, provided with openings at its lower edge, a tube extending in the neighborhood of the top of the containing element, connected with a source of fluid-pressure, said tube opening into and being secured to the inverted cup, and the positive and negative elements of the battery resting on the top of the inverted cup, substantially as and for the purpose described.

2. A battery-cell comprising a jar, an inverted cup resting on the bottom thereof provided with openings at its lower edge, a tube opening into and secured to the top of said inverted cup, and the positive and negative elements of said battery resting on the top of said inverted cup, substantially as and for the purpose described.

3. A battery-cell comprising a jar, an inverted cup resting on the bottom thereof, provided with openings at its lower edge, a tube opening into and secured to said inverted cup, said tube connecting with a source of fluid-pressure, the positive and negative elements of the battery resting upon said inverted cup, and the battery liquid filling said jar up to a point below said positive and negative elements, substantially as and for the purpose described.

WINFIELD S. BRYAN.

Witnesses:
A. D. MURPHEY,
CLARENCE E. MEHLHOPE.